UNITED STATES PATENT OFFICE.

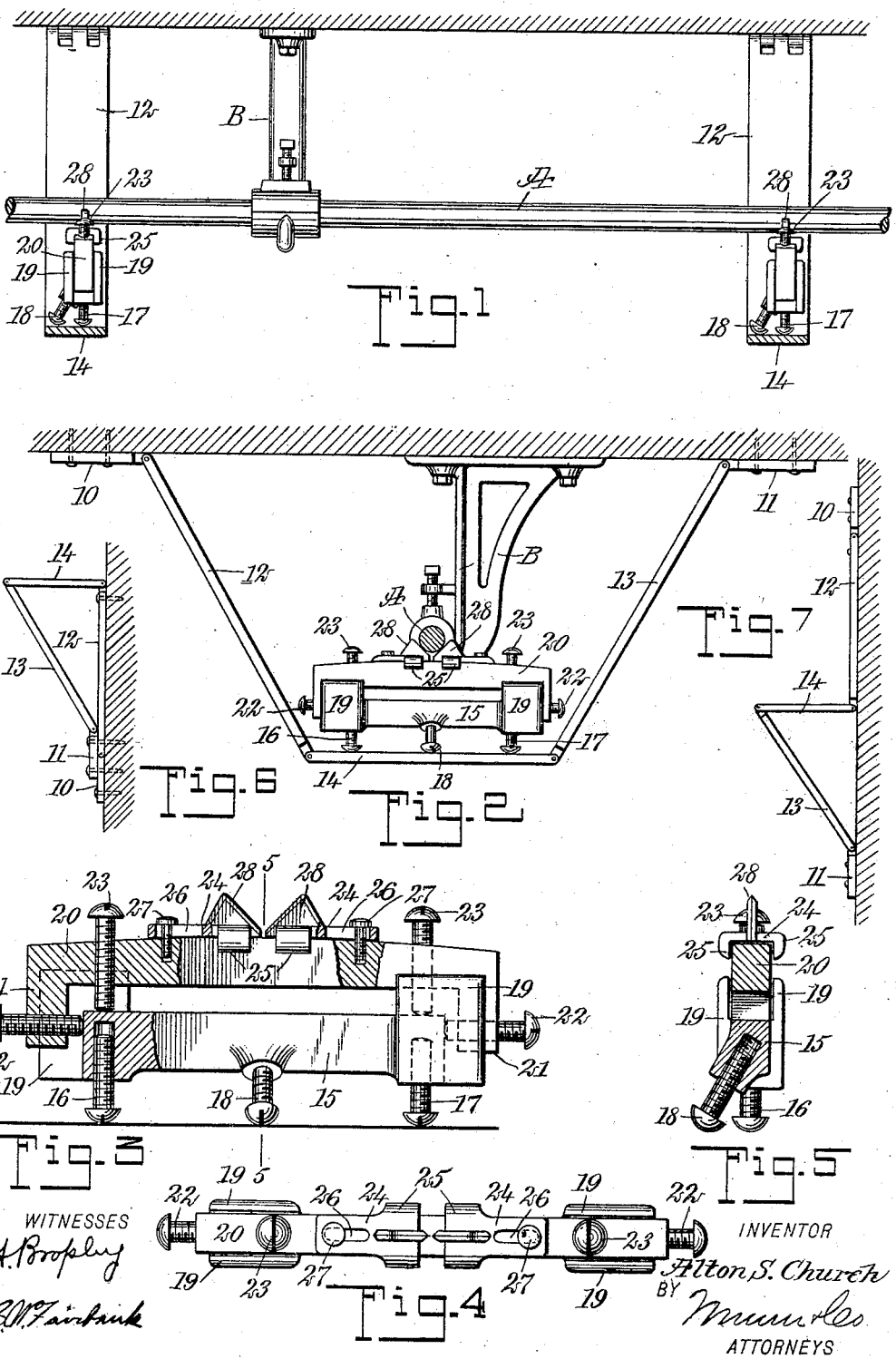

ALTON SQUEAR CHURCH, OF BATH, MICHIGAN.

SHAFT-ALINER.

No. 915,552.

Specification of Letters Patent.

Patented March 16, 1909.

Application filed March 28, 1908. Serial No. 423,904.

*To all whom it may concern:*

Be it known that I, ALTON SQUEAR CHURCH, a citizen of the United States, and a resident of Bath, in the county of Clinton and State of Michigan, have invented a new and Improved Shaft-Aliner, of which the following is a full, clear, and exact description.

This invention relates to certain improvements in means for supporting shafts, and holding them in proper alinement while the bearings thereof are being babbitted or adjusted.

The special object of the invention is to provide an aliner or support capable of attachment to various sized shafts and to hold them in any desired position in respect to a wall, ceiling, or other stationary body.

Reference is to be had to the accompanying drawings, forming a part of this specification, in which similar characters of reference indicate corresponding parts in all the figures, and in which—

Figure 1 is a side elevation of a shaft held by a pair of supports constructed in accordance with my invention; Fig. 2 is a transverse section through the shaft and showing the support or aliner in side elevation; Fig. 3 is a side view of the aliner proper, a portion being shown in section; Fig. 4 is a top plan view of the part shown in Fig. 3; Fig. 5 is a vertical section on the line 5—5 of Fig. 3; Fig. 6 is a side elevation of the bracket forming a part of the support and illustrating one position which the parts may assume; and Fig. 7 is a view similar to Fig. 6, but showing the parts of the bracket secured to the wall in a different manner.

My improved apparatus is made up of two separate parts one of which comprises a bracket adapted to be secured to a wall, ceiling, or other suitable body, adjacent to the point at which the shaft is to be held, and the other comprising the shaft holder adapted to rest upon the bracket and receive the shaft.

My improved bracket is preferably made up of a plurality of links hinged together, each link being formed of a metal plate of a width sufficiently great to form a supporting surface for the shaft holder. As shown, the bracket is formed of five links, the two end ones being adapted to be secured to the wall or ceiling and the other links being adapted to extend outwardly therefrom, so as to present a substantially horizontal supporting surface.

With the parts of the bracket arranged as illustrated in Figs. 1 and 2, the two end links 10 and 11 are secured to the ceiling in such a position that the links 12 and 13, adjacent thereto, depend therefrom and serve to support the center link 14 in a horizontal position.

With the parts of the bracket arranged as shown in Fig. 6, one of the links 10 and its adjacent link 12 are both secured to the wall in alinement with each other, the other terminal link 11 is secured adjacent the first-mentioned terminal link, and the link 13 extends outwardly as a diagonal brace to support the link 14 in its horizontal position.

With the bracket arranged as indicated in Fig. 7, the links 11, 13 and 14 are disposed substantially as shown in Fig. 6, but the links 12 and 10 extend upwardly from the horizontal link rather than downwardly.

The links may be arranged in various other forms and connected to various different surfaces, objects, or bodies, adjacent the shaft in such a manner that one of the links will be held substantially horizontal and constitute a supporting surface for the shaft holder.

The specific form of shaft holder illustrated in the accompanying drawings, involves a plurality of members so connected together as to adapt the holder to fit any size shaft, and to permit of an adjustment of that shaft in a vertical, horizontal, or diagonal direction. One of the members 15 of the holder constitutes a base or standard, adapted to be supported upon the bracket. To insure the even supporting of the standard, even though the bracket be warped, bent or inclined, or even though a rough or curved supporting surface be employed in place of the bracket, the standard is provided with three legs 16, 17 and 18, to form a three-point support. Each of the legs is preferably threaded into the member 15, and one of the legs, preferably the center leg 18, extends outwardly at an angle to the plane of the other two legs, so as to insure the stability of the standard. At each end of the member 15, I preferably form integral therewith, guide plates 19 extending outwardly beyond the ends of the member 15 and upwardly above the top thereof and spaced apart a distance substantially equal to the thickness of the upper or body member 20 of the shaft holder. This member 20 is provided with depending arms or lugs 21, extending between the guide plates 19 and adjacent the ends of the standard 15. Each lug carries an adjusting screw 22, adapted to engage with the ends of the member 15, and the body member 20, adjacent the depending lugs, carries adjusting screws 23, adapted to engage with the upper surface of the standard. By loosening one of the said screws 22 and tightening the other, the body member 20 may be moved longitudinally in respect to the standard, while by adjusting the screws 23, the elevation or inclination of the body member may be varied at will.

The body member carries upon the upper surface thereof, oppositely-disposed slides 24, each having depending lugs 25 for engagement with the sides of the body member and also having slots 26 through which screws 27 extend into the upper surface of the body. The slides 24 are free to move longitudinally within the limits determined by the length of the slots 26 but are held from lateral movement both by the screws 27 and by the side lugs 25. Each slide carries upon the upper surface thereof, a triangular lug 28, having an inclined knife edge. The two knife edges of the two lugs set at an angle to each other to form a V-shaped notch therebetween, and within which the shaft lies when being supported by my improved aliner and while the bearings of the shaft are being repaired, adjusted re-babbitted. The slides may be moved toward or from each other to vary the distance between the knife edges of the lugs 28, so as to adapt the space between said lugs to shafts of different diameter.

By the adjustment of the bracket, the adjustment of the supporting legs of the standard, the longitudinal and vertical adjustment of the body, and the lateral adjustment of the lugs 28, my improved aliner may be adapted for holding any kind of a shaft of any machine in the desired position.

In Fig. 1, I have illustrated my improved aliner as being employed for supporting a shaft A substantially parallel to the ceiling. Two of the aliners are employed, one at each side of the bearing bracket B, so that the latter may be entirely removed, re-adjusted, or re-babbitted, without varying the juxta-position of the shaft.

Having thus described my invention, I claim as new and desire to secure by Letters Patent:

1. In combination, a standard having oppositely-disposed upwardly-extending substantially parallel flanges adjacent opposite ends thereof, means for varying the elevation and inclination of said standard, a body carried by said standard intermediate said flanges and having downwardly-extending terminal portions adjacent the ends of said standard but spaced therefrom, means extending through said terminal portions into engagement with the ends of said standard, for moving said body longitudinally, means extending through said body into engagement with the upper surface of said standard for varying the elevation of said body, and slides carried by said body, each of said slides being held against lateral movement and adjustable longitudinally of the body, said slides presenting oppositely-inclined supporting edges for the shaft.

2. A shaft aliner having in combination, a standard, a body carried thereby, means for varying the elevation and inclination of said body in respect to said standard, slides carried by said body, each of said slides having downwardly-extending flanges integral therewith and in engagement with opposite sides of said body for guiding the slides longitudinally of the body and preventing lateral movement, each of said slides having a slot extending longitudinally thereof, and studs carried by said body and extending through said slides for limiting the longitudinal movement, said slides presenting a V-shaped notch therebetween for the reception of a shaft.

3. A shaft aliner having in combination, a bracket comprising a plurality of straight links, each formed of a metal plate, said links being hinged together in series, means for securing the end links to a supporting surface independently of each other, whereby any one of the intermediate links may present a substantially horizontal surface, a standard mounted on said last-mentioned links and removable therefrom, and means connected to said standard and vertically disposed in respect thereto for automatically supporting a shaft.

In testimony whereof, I have signed my name to this specification in the presence of two subscribing witnesses.

ALTON SQUEAR CHURCH.

Witnesses:
H. H. PULVER,
EDITH PARKER.